Nov. 30, 1965 B. J. HECKERT 3,220,180
RADIATION COOLED ROCKET THRUST MOTOR
Filed April 30, 1962

INVENTOR.
BRUCE J. HECKERT
BY
R. E. Geauque
ATTORNEY

United States Patent Office 3,220,180
Patented Nov. 30, 1965

3,220,180
RADIATION COOLED ROCKET THRUST MOTOR
Bruce J. Heckert, Canoga Park, Calif., assignor to The
Marquardt Corporation, Van Nuys, Calif., a corporation of California
Filed Apr. 30, 1962, Ser. No. 190,873
3 Claims. (Cl. 60—35.6)

This invention relates to a radiation cooled rocket thrust motor, and more particularly to a bipropellant thrust motor for reaction control systems utilized to control attitude, trajectory and position of vehicles, such as satellites.

When a rocket, reaction control motor is utilized for the control of a satellite, it would be advantageous to permit the complete motor to radiate directly to outer space since outer space represents a good black body for radiation absorption. However, the thrust motor should not be mounted in such a manner since the motor could be severely damaged upon re-entry into the atmosphere. Therefore, it is desirable to bury the thrust motor within the vehicle and continually cool the motor so that radiated heat will not be absorbed within the vehicle with resultant damage to vehicle parts. Because of the high temperature generated in the thrust chamber during production of the working gas, the greatest cooling capacity is required to absorb heat radiation from the walls of the thrust chamber.

It has been known to regeneratively cool a combustion chamber by passing either fuel or oxidizer or both through tubes passing around the thrust chamber walls and directly in contact with the walls. An alternate known manner of obtaining a low external wall temperature is to utilize an ablative thrust chamber wherein the internal surface of the thrust chamber is fabricated of a material which is slowly evaporated to absorb the heat of combustion. In the present invention, the thrust chamber is formed of a simple metal wall capable of withstanding temperatures in the range of 2500 to 3000 degrees Fahrenheit, and the wall is cooled by locating a cooling coil along the chamber wall in spaced relation thereto, in order to absorb the radiated heat with the fuel and/or oxidizer flowing through the coil on the way to the combustion chamber. Thus, by absorbing the heat radiated by the chamber wall, the radiated heat cannot enter into the interior of the supporting vehicle.

The use of an ablative chamber has the disadvantage that the internal surface of the motor changes configuration during operation and therefore, a change in performance results upon restarting of the engine. Also, an excessive weight of engine must be utilized if the ablative engine is to operate for long periods of time. On the other hand, the radiation cooled rocket thrust motor of the present invention has unlimited operating capability and no degradation in performance results upon restarting, since the metal walls in contact with the combustion gas do not change shape during operation. Further, the metal walls are lighter than comparable ablative motor walls.

Regeneratively cooled combustion chambers have the disadvantage that the high heat transfer rate per unit area into the fuel produces the hazard of fuel explosion in the cooling passages. Upon shut down, there is a danger of overheating and vaporizing the fuel trapped in the cooling passages, thus preventing restarting. In the present invention, the fuel in the cooling coil runs cooler during steady state operation and danger of fuel explosion is not encountered. Also, because of the fact that the fuel does run cooler, it is able to absorb a large amount of heat at shut down without the danger of overheating the fuel. Thus, the present invention makes available novel apparatus and a novel method of cooling rocket motors, more particularly, motors which are subject to restarting.

It is therefore an object of the present invention to provide a radiation cooled rocket thrust motor which can be buried within the supporting vehicle without danger of damaging radiation into the interior of the vehicle.

Another object of the present invention is to provide a radiation cooled rocket thrust chamber in which cooling coils are spaced from, and surround the thrust chamber, in order to absorb heat radiated from the high temperature wall of the thrust chamber, said cooling coils receiving a reaction substance on its way to the thrust chamber.

A further object of the present invention is to provide a radiation cooled rocket thrust chamber, operating at a high wall temperature, and radiating to cooling coils spaced from, and surrounding the thrust chamber; the propellant for the chamber being passed through the coils without being subject to a dangerous heat transfer rate, and without danger of overheating and vaporizing the propellant upon shut down of the chamber, so that immediate restarts are possible.

Another object of the invention is to provide a rocket motor thrust chamber which is radiation cooled by fuel passing through coils spaced from the chamber, on its way to the combustion chamber, the fuel being raised only slightly in temperature during steady state operation, and being capable of absorbing a high heat load upon shut down when circulation of the fuel ceases.

Another object of the invention is to provide a method of cooling a rocket motor with a propellant, while preventing fuel explosion and overheating on shut down.

These and other objects of the invention not specifically set forth above will become readily apparent from the accompanying description and drawings, in which.

Figure 1:
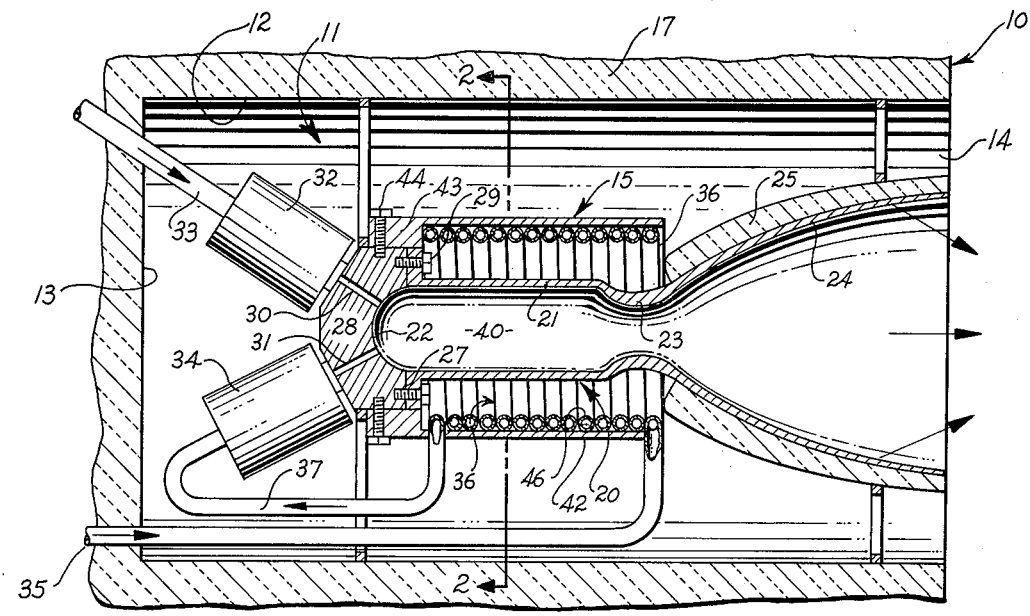
FIGURE 1 is a vertical section through the rocket motor of the present invention, and through the vehicle recess in which the motor is located.
Figure 2:
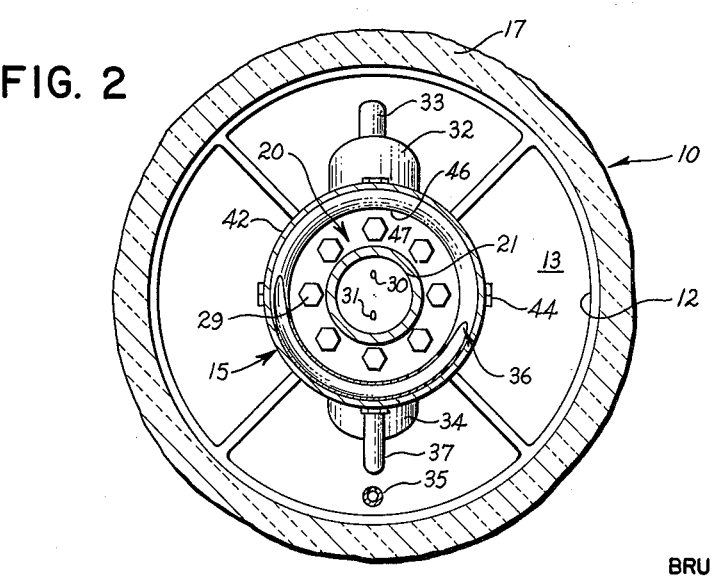
FIGURE 2 is a transverse vertical section along line 2—2 of FIGURE 1 showing the cooling coils spaced from the wall of the thrust chamber.

Referring to the embodiment of the invention chosen for illustration, supporting vehicle 10 contains a circular well or recess 11, which is defined by cylindrical wall 12 and end 13. The opposite end 14 is open and receives the thrust motor 15. The cylindrical wall 12 and the end wall 13 are covered by an insulation layer 17 to prevent heat radiation into the interior of the vehicle 10, which contains instrumentation and other objects which must be protected. Since the thrust motor 15 is located within the recess 11, it will be protected against damage during re-entry of the vehicle. However, since the motor is located within recess 11, the motor components cannot radiate to the environment, even though outer space is a good radiator. Therefore, some other cooling must be provided.

The rocket motor 15 comprises a combustion chamber 20 having a cylindrical side wall 21 and an end wall 22. The wall 21 connects with nozzle throat 23 and the nozzle throat connects with the nozzle divergent wall 24 which directs the combustion gases exteriorly of the mounting vehicle to produce thrust. Since the inner surface of nozzle wall 24 can radiate to the outer surrounding, an insulation layer 25 applied to the wall will be sufficient to prevent excess heat radiation from wall 24 into the vehicle 10. Any suitable thermal insulation can be utilized for layer 25 around the nozzle wall, to provide a low outside surface temperature.

The cylinder wall 21 of combustion chamber 20 has a circular end flange 27 which is secured to injector head 28 by a plurality of bolts 29. The inner surface 22 of injector head 28 is dome shaped and communicates with oxidizer passage 30 and fuel passage 31, both in the head 28. The fuel and oxidizer supplies can be contained within the mounting vehicle and on the opposite side of recess 11 from the rocket motor 15. An oxidizer valve 32 connects with passage 30, and is connected with the oxidizer supply through passage 33. Also, fuel valve 34 connects with passage 31 and is connected with the fuel supply through passage 35, cooling coils 36 and passage 37, all connected in series.

The fuel valve 34 and the oxidizer valve 32 can be of any well-known standard construction, in order to regulate the quantities of fuel and oxidizer entering the combustion chamber 20 and reacting within space 40 to produce high temperature, high pressure gas used as the working fluid for the rocket motor. The valves 32 and 34 can provide a regulated constant flow of oxidizer and fuel, or can produce intermittent pulses of fuel and oxidizer in order to make it easier to control the output of the rocket. Such an intermittent valve construction for a rocket motor is shown in the U.S. patent application entitled Pulse Rocket, Serial No. 69,039 filed November 14, 1960 by Warren P. Boardman, Jr., now Patent No. 3,178,884, and assigned to the same assignee.

The rocket motor 15 is so constructed that during steady state operation, the wall 21 will reach a temperature of about 2800° F. when radiating to ambient surrounding, and it is apparent that radiation of heat from the wall directly to the vehicle would not be permissible. In order to withstand this temperature, the chamber wall 21 can be fabricated of any suitable high temperature metal, such as molybdenum coated on its exterior with any suitable oxidation resistant coating. Since the hot gases are expelled through the nozzle throat 23 and the nozzle wall 24 into the ambient surrounding, it is necessary to cool the nozzle wall and throat as well as the combustion chamber. As previously stated, the vehicle is adequately protected from nozzle wall 24 by insulation 25, and the cooling coil 36 extends along the combustion chamber wall 21 and nozzle throat 23 to cool these components.

The coil 36 is supported by a cylindrical shell 42, having an enlarged end section 43 which is secured to the injector head 28 by means of bolts 44. The coil 36 can be secured to the shell 42 by brazing or by any other suitable means, and the cooling passage could be formed integrally within a thick shell. The inside coil surface 46 of the coil 36, which is opposite the high temperature wall 21, and throat 23, is coated with a thin high emissivity coating, such as black paint, to increase the radiation heat transfer from the combustion chamber wall. The width of space 47 which separates the coil from the motor, is sufficiently wide to permit the installation of the coils but otherwise is not critical and can be as low as one half inch from the wall 21.

The outside temperature of the wall 21 of the combustion chamber will be about the same, regardless of whether the wall radiates to the coil 36 containing the fuel or whether it radiates to atmosphere or outer space. In other words, the heat is radiated from the wall to fuel. Under installed operating conditions, the heat loss through the wall 21 can be represented as:

$$Q = h(T_g - T_w)$$

where Q is B.t.u. per square foot per hour "$h$" is the forced convection heat transfer coefficient, $T_g$ is the temperature of the gas within the chamber, and $T_w$ is the outer wall temperature. Since the wall temperature is permitted to remain as high as practical, it is apparent that minimum heat loss takes place through wall 21, so that the radiation heat load on the fuel flowing in coil 36 is kept to a minimum. In other words, the heat flow through the wall 21 is the quantity of heat that will have to be absorbed by radiation within the fuel as it passes through the coil 36 on the way to the fuel valve 34.

As previously stated, the wall temperature is not materially affected by the temperature of the absorber, whether the absorber be the atmosphere or fuel in coil 36.

The formula for transfer by radiation is as follows:

$$Q = .173 \times 10^{-8} \Sigma A (T_w^4 - T_s^4)$$

where Q is the B.t.u. per square foot per hour absorbed by the wall 21 through radiation, $\Sigma$ the emissivity coefficient, $T_w$ is the wall temperature in ° R. and $T_s$ is the temperature of the absorber surface in ° R. Since $T_w$ is about 3300° R. and that number is to the fourth power in the equation, small variation in $T_s$ will not materially affect heat absorption and wall temperature. Under steady state conditions, the fuel or propellant will enter passage 35 at about 70° F. and will leave the coil 36 through passage 37 at about 130° F. since the fuel flow required for the motor is sufficient to prevent any greater temperature rise. Thus, the average temperature of the coil surface $T_s$ will be about 140° F. or 600° R. for an average fuel temperature of 100° F. and a temperature drop across the fuel film of 40° F.

From the above two equations, it is seen that the heat loss Q through the wall 21 can be held to a minimum because the wall temperature is maintained as high as the material will stand. As a consequence, the radiation absorption by the fuel in the coil 36 is at a minimum, thereby reducing the hazard of fuel explosion, and the temperature of the fuel is raised only slightly in passing through the coils. This is an important factor in permitting shut down and restart of the rocket motor. Since the maximum fuel temperature during steady state operation reaches only 130° F., the motor can be shut down and the fuel, stagnant within the coils, will not increase in temperature above 250 to 300° F., because sufficient heat capacity is provided in the coil to absorb the heat energy in the combustion chamber walls. This fuel temperature is well below the fuel explosion temperature or the fuel overheating temperature.

In the event that the wall 21 were regeneratively cooled with coils contacting the wall, the resulting large temperature differential between the combustion gas temperature and cooling coil results in a heat flux which is very high, and explosion of the fuel could be anticipated as well as its decomposition and breakdown. Even though the wall temperature $T_w$ could be maintained low enough by regenerative cooling to prevent damage to the exterior of the vehicle without fuel explosion, such a condition would be accompanied by a higher heat loss from the combustion chamber because of the temperature differential between the chamber and the exterior of the wall. In addition, even though the wall temperature could be maintained cool enough by regenerative cooling, upon shut down, a large quantity of heat would flow into the fuel trapped in the regenerative cooling coils and the fuel would overheat and vaporize in the cooling coils after shut down. Therefore, it would be impossible to immediately restart the thrust engine as required in the control of attitude, trajectory and position of the mounting vehicle. In summary, in the regenerative system, the walls cannot be at high temperatures to cut down the heat loss since the walls will then radiate into the vehicle, and if the walls are kept cool in the regenerative system, excessive heat loss results and the heat flux per square inch of wall becomes dangerous even during steady state operations; further, the heat transfer upon shut down makes the system inoperative.

The coil 36 is extended to cover both the combustion chamber wall and nozzle throat wall, but only the chamber wall could be covered since the greatest radiation will be from the combustion chamber wall. Also, the enlarged thickness of the injector head sufficiently cuts down radiation from the end wall 22 so that no cooling coil is utilized opposite end 22, although a cooling coil section could be so located. While the invention is adaptable to buried installation, is is also useable for shielding the rocket motor from other surroundings than vehicles. Any suitable fuels, such as hydrazine fuels or hydrocarbon fuels, can be utilized with a suitable oxidizer. Also, propellants and oxidizers which automatically produce a hypergolic reaction in the chamber require no separate ignition system, and therefore, none is illustrated in the drawings. Various other modifications are contemplated by those skilled in the art without departing from the spirit and scope of the invention as hereinafter defined by the appended claims.

What is claimed is:

1. A rocket thrust motor comprising: a combustion chamber connected with a nozzle, an injector head secured to said combustion chamber, a support member surrounding said injector head and secured thereto, said support member extending radially beyond the wall of the combustion chamber, a cooling coil connected to said support member and extending along said combustion chamber in spaced relation from the wall of said combustion chamber, each turn of said coil being in substantially complete contact with each adjacent turn to present a substantially closed surface about the wall of said combustion chamber, passage means for connecting a supply of reaction substance with said coil, and conduit means for connecting said substance discharged from said coil to said combustion chamber for production of a working fluid for said nozzle, heat radiated from said combustion chamber being absorbed by said substance while passing through said coil and while stagnant in said coil after shutdown in order to protect the motor surroundings from said radiated heat.

2. In a buried installation for a rocket thrust motor in a supporting vehicle, a buried combustion chamber having a cylindrical side wall with an ejector head at one end thereof, a buried nozzle comprising a divergent nozzle wall and a nozzle throat connected with said combustion chamber at the other end of said side wall, the discharge end of said nozzle being directed to ambient surroundings to permit radiation from the interior of the nozzle wall to the ambient surroundings, an injector head secured to said combusion chamber, a support member surrounding said injector head and secured thereto, said support member extending radially beyond the wall of the combusion chamber, a cooling coil connected to said support member and extending along said combustion chamber in spaced relation from the wall of said combustion chamber, each turn of said coil being in substantially complete contact with each adjacent turn to present a substantially closed surface about the wall of said combustion chamber, passage means for connecting a supply of reaction substance with said coil, and conduit means for connecting said substance discharged from said coil to said combustion chamber for production of a working fluid for said nozzle, heat radiated from said combustion chamber being absorbed by said substance while passing through said coil and while stagnant in said coil after shutdown in order to protect the supporting vehicle.

3. A rocket thrust motor comprising: a combustion chamber connected with a nozzle, injector means for said combustion chamber, support means extending along said combustion chamber and radially spaced therefrom, means for securing said support means in fixed relationship with said combustion chamber, a cooling coil connected to said support member and extending along said combustion chamber in spaced relation from the wall of said combustion chamber, each turn of said coil being in substantially complete contact with each adjacent turn to present a substantially closed surface about the wall of said combustion chamber, passage means for connecting a supply of reaction substance with said coil, and conduit means for connecting said substance discharged from said coil to said combustion chamber for production of a working fluid for said nozzle, heat radiated from said combustion chamber being absorbed by said substance while passing through said coil and while stagnant in said coil after shutdown in order to protect the motor surroundings from said radiated heat.

References Cited by the Examiner
UNITED STATES PATENTS

| 2,217,649 | 10/1940 | Goddard. | |
| 2,406,926 | 9/1946 | Summerfield | 60—35.6 |
| 2,551,112 | 5/1951 | Goddard | 60—35.6 X |
| 2,798,361 | 7/1957 | Hiersch | 60—35.6 X |
| 2,991,617 | 7/1961 | Nerad et al. | 60—39.66 X |
| 3,019,607 | 2/1962 | Bunger | 60—39.66 |

MARK NEWMAN, *Primary Examiner.*

JULIUS E. WEST, SAMUEL LEVINE, *Examiners.*